United States Patent
Taneda et al.

(10) Patent No.: US 7,926,820 B2
(45) Date of Patent: Apr. 19, 2011

(54) STABILIZER CONTROL APPARATUS

(75) Inventors: Akiya Taneda, Anjo (JP); Shuuetsu Suzuki, Gamagori (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 12/611,967

(22) Filed: Nov. 4, 2009

(65) Prior Publication Data

US 2010/0148456 A1    Jun. 17, 2010

(30) Foreign Application Priority Data

Dec. 16, 2008    (JP) ................................. 2008-319822

(51) Int. Cl.
*B60G 17/018*    (2006.01)
(52) U.S. Cl. ................. 280/5.508; 188/266.1; 188/266.2
(58) Field of Classification Search ............... 280/5.502, 280/5.506, 5.507, 5.508, 5.511, 124.106, 280/124.152, 124.154; 188/266.1, 266.2, 188/266.6, 322.13, 322.2
See application file for complete search history.

(56) References Cited

U.S. PATENT DOCUMENTS

| | | | |
|---|---|---|---|
| 6,276,693 B1 * | 8/2001 | Oakley et al. | 280/5.506 |
| 6,428,019 B1 | 8/2002 | Kincad et al. | |
| 7,029,014 B2 * | 4/2006 | Hamm | 280/5.502 |

FOREIGN PATENT DOCUMENTS

JP    2002-137619 A    5/2002

* cited by examiner

*Primary Examiner* — Paul N Dickson
*Assistant Examiner* — Robert A Coker
(74) *Attorney, Agent, or Firm* — Buchanan Ingersoll & Rooney PC

(57) ABSTRACT

A stabilizer control apparatus includes a stabilizer bar including both ends supported by right and left wheels of a vehicle, respectively, and an intermediate portion supported to a vehicle body by first and second supporting members, and a switching device arranged between one of the first and second supporting members and the vehicle body and including a cylinder member, a tubular piston member, a spring member, and an engaging/disengaging mechanism. The switching device switches over the spring member from an extendable/retractable position to a neutral position and vice versa. The engaging/disengaging mechanism allows the piston member to axially move relative to the cylinder member when the spring member is in the extendable/retractable position and prevents the piston member from axially moving relative to the cylinder member when the spring member is retained in the neutral position.

14 Claims, 4 Drawing Sheets

STABILIZER CONTROL APPARATUS

CROSS REFERENCE TO RELATED APPLICATIONS

This application is based on and claims priority under 35 U.S.C. §119 to Japanese Patent Application 2008-319822, filed on Dec. 16, 2008, the entire content of which is incorporated herein by reference.

TECHNICAL FIELD

This disclosure relates to a stabilizer control apparatus for a vehicle.

BACKGROUND

A stabilizer control apparatus for a vehicle is generally configured to reduce or minimize a roll motion of a vehicle body by applying an appropriate roll moment to the vehicle body by the use of actuation of stabilizer bars while the vehicle is turning. In order to implement such roll stabilizing function, for example, a known stabilizer assembly for a vehicle is configured so as to connect/disconnect between a pair of right and left stabilizer bars, which is arranged at right and left wheels, respectively, by means of a clutch mechanism. In particular, a semi-active anti-roll system described in JP2002-137619A (hereinafter referred to as Patent document 1) serving as a stabilizer assembly for a vehicle has a pair of wheels arranged away from each other in a transverse direction. Such stabilizer assembly includes first and second stabilizer members and a clutch assembly. Each of the first and second stabilizer members is connected to one of the wheels arranged away from each other in the transverse direction. The clutch assembly connected to the first and second stabilizer members is operable in first and second states. In the first state of the clutch assembly, the first and second stabilizer members rotate independently from each other so as not to transmit an operating force of one of the wheels to the other wheel. In the second state of the clutch assembly, the first and second stabilizer members are connected to each other so as to rotate integrally with each other in order to avoid rolling of a vehicle body.

In the stabilizer assembly described in Patent document 1, the clutch assembly is arranged between the first and second stabilizer members (including torsion bars and referred to as stabilizer bars), thereby connecting/disconnecting the first and second stabilizer members. Accordingly, when the vehicle body rolls, an extremely large torque is applied between the first stabilizer member and the clutch assembly and between the second stabilizer member and the clutch assembly. Consequently, it is necessary to firmly connect the clutch assembly to the first and second stabilizer members, thus requiring a large clutch assembly (actuator). As a result, it is required to expand the manufacturing process of the stabilizer assembly, thereby increasing the cost of the stabilizer assembly. Further, since the clutch assembly is arranged between the first and second stabilizer members, the clutch assembly may make contact with a road surface when the vehicle runs on a rough road. Furthermore, the clutch assembly integrally rotates with the first and second stabilizer members, therefore requiring a sufficient installation space for preventing the clutch assembly from making contact with the vehicle body.

On the other hand, for example, in the case of a stabilizer assembly for a vehicle, which includes a non-divided stabilizer bar, both ends of the stabilizer bar are supported by right and left wheels of the vehicle, respectively, and the stabilizer bar is supported by at least two supporting members arranged in an intermediate portion of the stabilizer bar. Further, a switching device is arranged between one of the supporting members and the vehicle body. The switching device arranged between one of the supporting members and the vehicle body is switched over from an extendable/retractable position to a neutral position corresponding to the time when the vehicle body is retained in a horizontal position, and vice versa. With such configuration of the stabilizer bar, the above-mentioned drawbacks may be prevented. However, when such switching device including a general mechanism is applied, the stabilizer assembly requires a fluid pressure source and a screw mechanism, thereby increasing the size. Consequently, a drawback such as the occurrence of a complicated and expensive stabilizer assembly may occur.

A need thus exists for a stabilizer control apparatus, which is not susceptible to the drawbacks mentioned above.

SUMMARY

According to an aspect of this disclosure, a stabilizer control apparatus includes a stabilizer bar including both ends supported by right and left wheels of a vehicle, respectively, and an intermediate portion supported to a vehicle body by first and second supporting members, and a switching device arranged between one of the first and second supporting members and the vehicle body and including a cylinder member, a tubular piston member, a spring member, and an engaging/disengaging mechanism. The switching device switches over the spring member from an extendable/retractable position to a neutral position and vice versa. The cylinder member is supported by one of the vehicle body and one of the first and second supporting members. The piston member is supported by the other of the vehicle body and one of the first and second supporting members and slidably inserted into the cylinder member. The spring member is accommodated in the piston member, which is inserted into the cylinder, and axially spanned between the piston member and the cylinder member. The engaging/disengaging mechanism allows the piston member to axially move relative to the cylinder member when the spring member is in the extendable/retractable position and prevents the piston member from axially moving relative to the cylinder member when the spring member is retained in the neutral position.

BRIEF DESCRIPTION OF THE DRAWINGS

The foregoing and additional features and characteristics of the disclosure will become more apparent from the following detailed description considered with the reference to the accompanying drawings, wherein.

DETAILED DESCRIPTION

Figure 2:
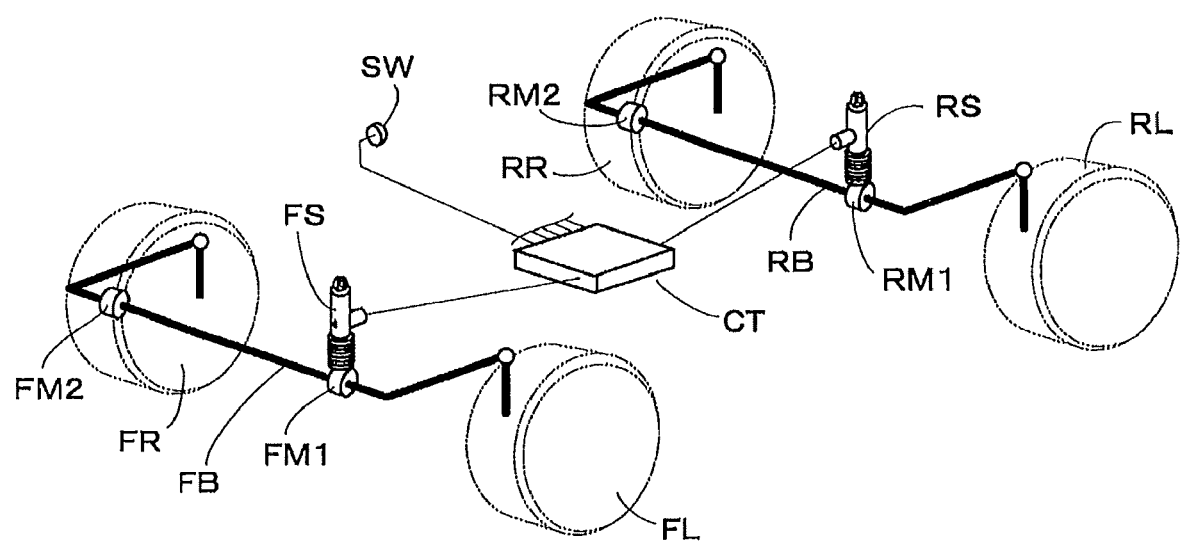
FIG. 2 is a perspective view showing an overall configuration of the stabilizer control apparatus according to the first embodiment.

A first embodiment of a stabilizer control apparatus will be explained with reference to the illustrations of the figures as follows. FIG. 2 is a perspective view showing an overall configuration of the stabilizer control apparatus of the first embodiment. Upper and lower positions described hereinafter will correspond to positions in a vertical direction of a vehicle. The stabilizer control apparatus includes a front stabilizer bar FB. As shown in FIG. 2, both ends of the front stabilizer bar FB are supported by a front right wheel FR and a front left wheel FL of the vehicle, respectively. An intermediate portion of the front stabilizer bar FB is generally supported to a vehicle body VB by first and second front mounting members FM1 and FM2 serving as first and second supporting members. In the first embodiment, the stabilizer control apparatus further includes a front switching device FS arranged between the vehicle body VB and one of the first front mounting members FM1, FM2 (the first front mounting member FM1 is applied to descriptions of the first embodiment). The front switching device FS includes a cylinder member 10, a tubular piston member 20, a spring member 30, and an engaging/disengaging mechanism 40. The front switching device FS switches over the spring member 30 from an extendable/retractable position to a neutral position and vice versa in accordance with an electric control of a controller CT. Further, a switch SW is arranged in a room of the vehicle. The front switching device FS may switch over the spring member 30 from the extendable/retractable position to the neutral position and vice versa by a manual operation of the switch SW. Here, the neutral position of the spring member 30 is under a condition when the vehicle body VB is retained in a horizontal position. In other words, the neutral position of the spring member 30 under a condition when the vehicle is on a horizontal road surface and heights of right and left wheels (for example, the front right and left wheels FR, FL) defined between the road surface and the vehicle body VB (a bottom face of the vehicle body VB) are approximately equal to each other.

As shown in FIG. 2, in the same way as the arrangement of the front stabilizer bar FB, both ends of a rear stabilizer bar RB are supported by rear right and left wheels RR, RL. An intermediate portion of the rear stabilizer bar RB is supported to the vehicle body VB by first and second rear mounting members RM1, RM2 serving as the first and second supporting members. A rear switching device RS is arranged between the vehicle body VB and the first rear mounting member RM1. Since configurations of the front switching device FS and the rear switching device RS are the same, the configuration of the front switching device FS will be representatively described as follows with reference to FIG. 1. In addition, either the front switching device FS or the rear switching device RS may be applied. Alternatively, both of the switching devices FS and the rear switching devices RS may be attached to the first, second front mounting members FM1, FM2 and the first and second rear mounting members RM1, RM2.

Figure 1:
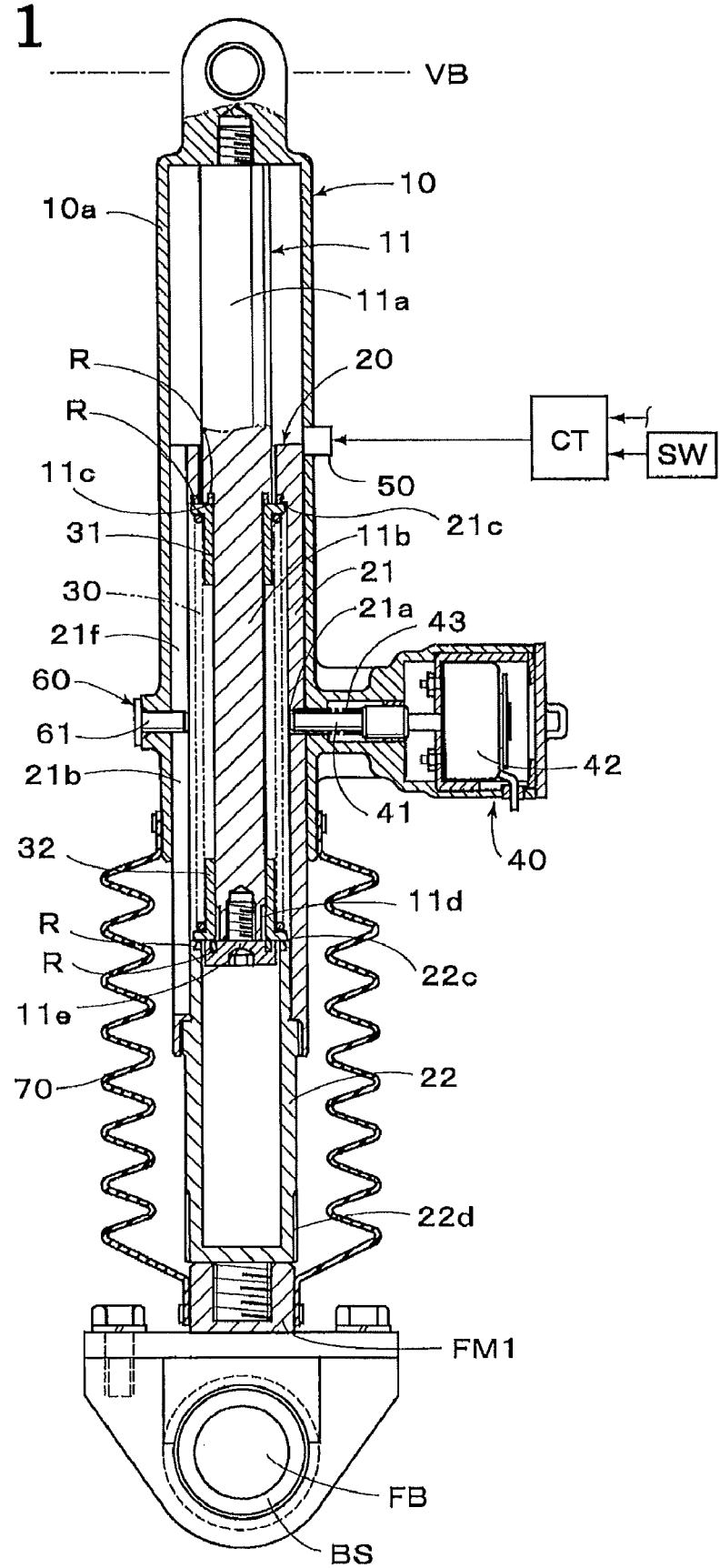
FIG. 1 is a longitudinal cross-sectional view showing a main configuration of a stabilizer control apparatus according to a first embodiment.

In FIG. 1, the cylinder member 10 of the front switching device FS is supported by the vehicle body VB. The tubular piston member 20 is slidably inserted into the cylinder member 10. A lower end portion of the piston member 20 is screwed in the first front mounting member FM1 (first supporting member). The first front mounting member FM1 is fixed to the front stabilizer bar FB via a bush BS serving as a buffer member arranged around the front stabilizer bar FB. The cylinder member 10 includes a bottomed tubular housing 10a and a rod 11 extending from a bottom portion of the housing 10a to an opening end of the housing 10a. The housing 10a and the rod 11 may be integrally formed with each other; however, an upper end portion of the rod 11 is screwed in the bottom portion of the housing 10a in the first embodiment. The rod 11 includes a large-diameter portion 11a and a small-diameter portion 11b. The large-diameter portion 11a of the rod 11 is formed so as to extend from the bottom portion of the housing 10a to an intermediate portion of the rod 11. The small-diameter portion 11b is formed so as to extend in a predetermined distance defined between the intermediate portion and a lower end portion of the rod 11, which is located in an axially opposite direction to the bottom portion of the housing 10a of the cylinder 10.

Meanwhile, the piston member 20 includes a first tubular piston 21 and a second tubular piston 22. The rod 11 is inserted into the first tubular piston 21. An upper end portion (first end portion) of the first tubular piston 21 is slidably supported by the rod 11. An upper end portion (first end portion) of the second tubular piston 22 is fitted into a lower end portion (second end portion) of the first tubular piston 21. A lower end portion (second end portion) of the second tubular piston 22 is supported by the first front mounting member FM1.

Further, the spring member 30 is accommodated in an internal space of the first tubular piston 21, which is defined between an outer surface of the rod 11 and an inner wall surface of the first tubular piston 21. The spring member 30 is spanned between the lower end portion of the rod 11 and the upper end portion of the first tubular piston 21, thereby serving as a centering spring to be retained in the neutral position. The spring member 30 according to the first embodiment includes a compression coil spring arranged between first and second retainers 31, 32. The first and second retainers 31, 32 are arranged at positions keeping the predetermined distance from each other between the intermediate portion of the rod 11 and the lower end portions of the rod 11, respectively. The spring member 30 is attached around the small-diameter portion 11b of the rod 11 in a biased state with a predetermined load, thereby serving as the centering spring. That is, as shown in FIG. 1, the spring member 30 is arranged around the small-diameter portion 11b of the rod 11 so that the first retainer 31 is in contact with an annular stepped section 11c in the rod 11 and so that the second retainer 32 is in contact with an end bolt 11e (fixing member) screwed in the lower end portion of the rod 11. Thus, the spring member 30 serving as the compression coil spring is arranged between the first and second retainers 31, 32 with the predetermined load, thereby being retained in the biased state.

Further, the engaging/disengaging mechanism 40 is supported at the housing 10a of the cylinder member 10. The engaging/disengaging mechanism 40 includes a lock pin 41 serving as a locking member and a solenoid device 42 serving as a driving device. The lock pin 41 is inserted into a hole 21a formed in the first tubular piston 21 and serving as a locking portion. The lock pin 41 moves through the hole 21a between engaged and disengaged positions. A return spring 43 is arranged around the lock pin 41. The return spring 43 serves as a biasing member biasing the lock pin 41 in a disengaging direction (direction to the right in FIG. 1). In the first embodiment, when the solenoid device 42 is not magnetized, the lock pin 41 is disengaged from the hole 21a by means of a biasing force of the return spring 43. Meanwhile, when the solenoid device 42 is magnetized, the lock pin 41 is driven and moved in an engaging direction (direction to the left in FIG. 1) against the biasing force of the return spring 43 so as to be engaged in the hole 21a. In addition, the lock pin 41 may be configured so as to move in the engaging direction when the solenoid device 42 is not magnetized and to move in the disengaging direction when the solenoid device 42 is magnetized.

Thus, the engaging/disengaging mechanism 40 selectively switches over the spring member 30 from the extendable/retractable position at which the piston member 20 is allowed to axially move relative to the cylinder member 10, to the neutral position at which the piston member 20 is prevented from axially moving relative to the cylinder member 10, and vice versa. In the first embodiment, when an engine is started, the solenoid device 42 is magnetized and the lock pin 41 moves in the engaging direction so as to be engaged in the hole 21a, thereby providing the condition as shown in FIG. 1 where the piston member 20 is prevented from axially moving relative to the cylinder member 10 due to an action of the spring member 30 retained in the neutral position. Further, a sensor 50 serving as a position detection device detecting a relative position of the piston member 20 to the cylinder member 10 is attached to the housing 10a. Thus, a detection signal of the sensor 50 is transmitted to the controller CT serving as a control device, thereby controlling an operation of the solenoid device 42 on the basis of a result of detection (a relative position of the piston member 20 to the cylinder member 10, which is detected by the sensor 50).

Moreover, a notched portion 21f is formed on an outer surface of the first tubular piston 21 as shown FIG. 1. The notched portion 21f of the first tubular piston 21 extends from a contact surface between the first tubular piston 21 and the second tubular piston 22 along an axial direction of the first tubular piston 21 and has an opening penetrating into the upper end portion of the first tubular piston 21. A pin 61 is fixed to the housing 10a so as to engage with the notched portion 21f. Thus, a rotation preventing mechanism 60 is configured so as to allow the piston member 20 to axially move relative to the cylinder member 10 and to prevent the piston member 20 from rotating around an axis of the piston member 20. In addition, a groove may be formed in the outer surface of the first tubular piston 21 instead of the notched portion 21f.

Assemblability is considered in the above-mentioned configuration. Each component is assembled as follows. Firstly, the large-diameter portion 11a of the rod 11 is screwed in the bottom portion of the housing 10a of the cylinder member 10. At this time, a lower end portion of the small-diameter portion 11b of the rod 11 is chamfered so as to forms two flat chamfers 11d opposed to each other across the axial center of the rod 11 and having axial cross-sectional surfaces facing each other, thereby enabling the rod 11 to be easily rotated by means of a tool. In addition, a rubber ring R for preventing a slapping sound is attached in an annular groove formed in the annular stepped section 11c formed between the large-diameter portion 11a and the small-diameter portion 11b of the rod 11, beforehand. Secondly, the small-diameter portion 11b of the rod 11 is inserted into the first tubular piston 21 and the first tubular piston 21 is accommodated in the housing 10a so that an end portion of the pin 61 is fitted in the notched portion 21f of the first tubular piston 21. Thus, an opening end of the upper end portion of the first tubular piston 21 is arranged so as to be fitted between an outer surface of the large-diameter portion 11a of the rod 11 and an inner wall surface of the housing 10a. The rubber ring R for preventing a slapping sound is arranged in an annular stepped section 21c formed in a stepped hole of the first tubular piston 21 beforehand.

Next, the first retainer 31 is attached around an upper end portion of the small-diameter portion 11b of the rod 11 and arranged so that a flange surface of the first retainer 31 is in contact with the annular stepped section 21c of the first tubular piston 21 and the annular stepped section 11c of the rod 11. Then, after the spring member 30 including the compression coil spring is attached around the small-diameter portion 11b and the second retainer 32 is attached around a lower end portion of the small-diameter portion 11b, the end bolt 11e as the fixing member is screwed in the lower end portion of the rod 11. Thus, the spring member 30 is slightly compressed, thereby being retained in a biased state. In addition, the rubber ring R for preventing a slapping sound is arranged in an annular section formed in an inner surface of a head portion of the end bolt 11e.

Further, an internal thread portion is formed on an inner circumferential surface of the lower end portion of the first tubular piston 21. An external thread portion is formed in an intermediate portion of the second tubular piston 22 forming a bottomed tubular body. When the internal thread portion of the first tubular piston 21 and the external thread portion of the second tubular piston 22 are engaged with each other, an opening end surface of the upper end portion of the second tubular piston 22 is in contact with a flange surface of the second retainer 32 as shown in FIG. 1. In this case, since an outer surface of the lower end portion of the second tubular piston 22 is chamfered so as to form two flat chamfers 22d opposed to each other across the axial center of the second tubular piston 22 and having axial cross-sectional surfaces facing each other, the second tubular piston 22 may be easily rotated by means of a tool. Furthermore, the rubber ring R for preventing a slapping sound is attached to the opening end surface of the upper end portion of the second tubular piston 22 beforehand. Then, after a rubber boot 70 is attached to the housing 10a, a nut of the first front mounting member FM1 is engaged with a threaded portion extending from the lower portion of the second tubular piston 22 in a downward direction of FIG. 1, thereby fixing the second tubular piston 22 to the first front mounting member FM1.

An operation of the stabilizer control apparatus configured as above will be described as follows. FIG. 1 shows the condition of the stabilizer control apparatus in which the spring member 30 is retained in the neutral position. Specifically, when the engine is started, the solenoid device 42 of the engaging/disengaging mechanism 40 is magnetized. At this time, the lock pin 41 moves in the engaging direction so as to be engaged in the hole 21a, thereby preventing the piston member 20 from moving in the axial direction (vertical direction in FIG. 1) relative to the cylinder member 10. Thus, the front stabilizer bar FB performs a desirable operation and prevents or minimizes rolling of the vehicle body VB.

On the other hand, after the solenoid device 42 is turned off (not magnetized), for example, due to an operation of the switch SW in an off-road driving condition of the vehicle, the lock pin 41 is disengaged from the hole 21a by the biasing force of the return spring 43 and moved to the disengaged position. Thereafter, the piston member 20 is allowed to axially move relative to the cylinder member 10, therefore enabling the piston member 20 to axially (vertically in FIG. 1) extend and retract relative to the cylinder member 10. Accordingly, since the piston member 20 slidably moves in the axial direction (vertical direction in FIG. 1), the front stabilizer bar FB does not perform a desirable function. However, the front stabilizer bar FB improves road holding abilities of the front right wheel FR and the front left wheel FL. Consequently, the ability of the vehicle to run on a rough road is improved. In this condition, the spring member 30 functions as a return spring, therefore preventing the front stabilizer bar FB from remaining in a downwardly moved state toward the direction of a road surface due to its own weight.

When a driving condition of the vehicle is changed from a off-road driving mode to a normal driving mode, a driver of the vehicle parks the vehicle on an approximately flat road surface so that the heights of the front right and left wheels FR, FL defined between the road surface and the vehicle body VB are approximately equal to each other. At this time, the spring member 30 functions as the centering spring so as to be retained in the neutral position, thereby returning a relative position between the cylinder member 10 and the piston member 20 to the position shown in FIG. 1. In addition, whether or not the cylinder member 10 and the piston member 20 are located in the position shown in FIG. 1 is determined based on a detection signal of the sensor 50, which is transmitted to the controller CT. Accordingly, the sensor 50 may be applied as a fail-safe device. Consequently, when the solenoid device 42 is turned on (magnetized) by an operation of the switch SW in such condition where the off-road condition is turned to the normal driving condition, the lock pin 41 moves in the engaging direction so as to be engaged in the hole 21a. Consequently, the piston member 20 is prevented from axially moving relative to the cylinder member 10 and the spring member 30 is retained in the neutral position. Thus, the front stabilizer bar FB performs a desirable function. Alternatively, the engaging/disengaging mechanism 40 may be configured so that the lock pin 41 moves in the engaging direction when the solenoid device 42 is not magnetized and so that the lock pin 41 moves in the disengaging direction when the solenoid device 42 is magnetized.

Figure 3:
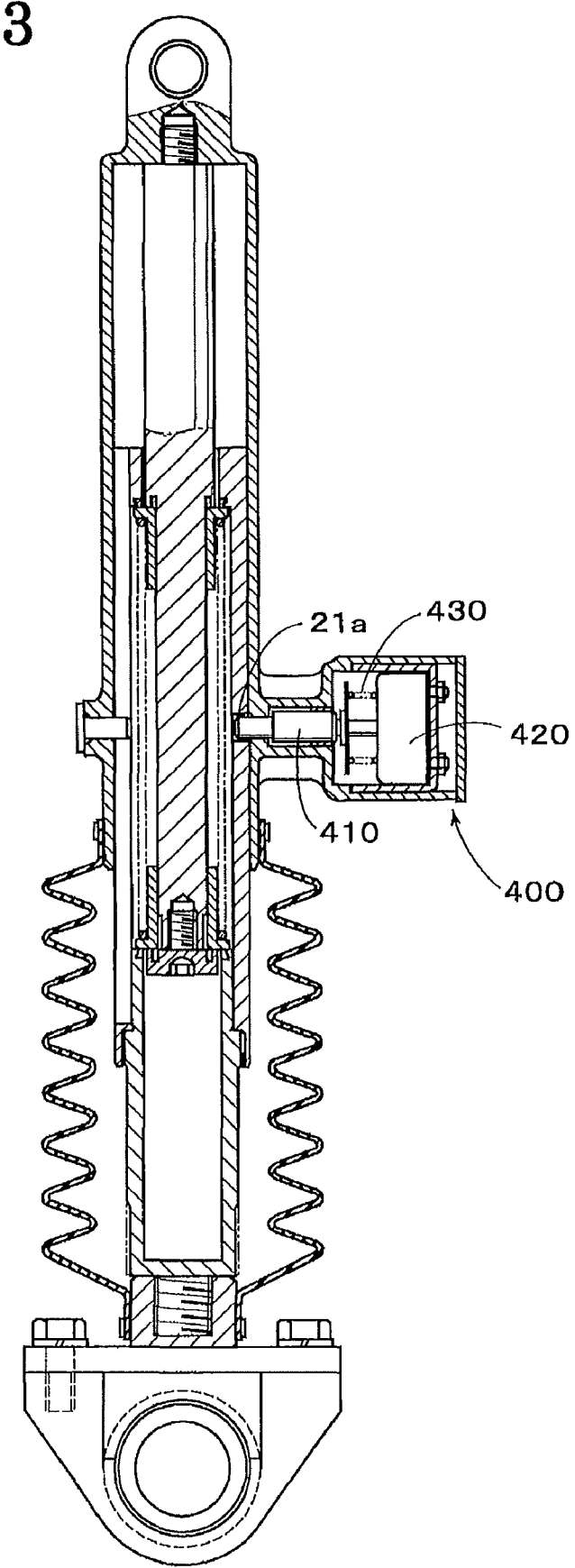
FIG. 3 is a cross-sectional view showing a main configuration of a stabilizer control apparatus according to a second embodiment.

FIG. 3 shows a second embodiment of a stabilizer control apparatus. In the second embodiment, the engaging/disengaging mechanism 40 of the first embodiment shown in FIG. 1 is modified in such a way that a return spring 430 serving as a compression coil spring is arranged between a lock pin 410 and a solenoid device 420. A basic configuration of the stabilizer control apparatus according to the second embodiment is similar to the configuration of the stabilizer control apparatus according to the first embodiment. As shown in FIG. 3, when the solenoid device 420 is not magnetized, the lock pin 410 is engaged in the hole 21a by means of a biasing force of the return spring 430. Meanwhile, when the solenoid device 420 is magnetized, the lock pin 410 is driven in a disengaging direction against the biasing force of the return spring 430 so as to be disengaged from the hole 21.

Figure 4:
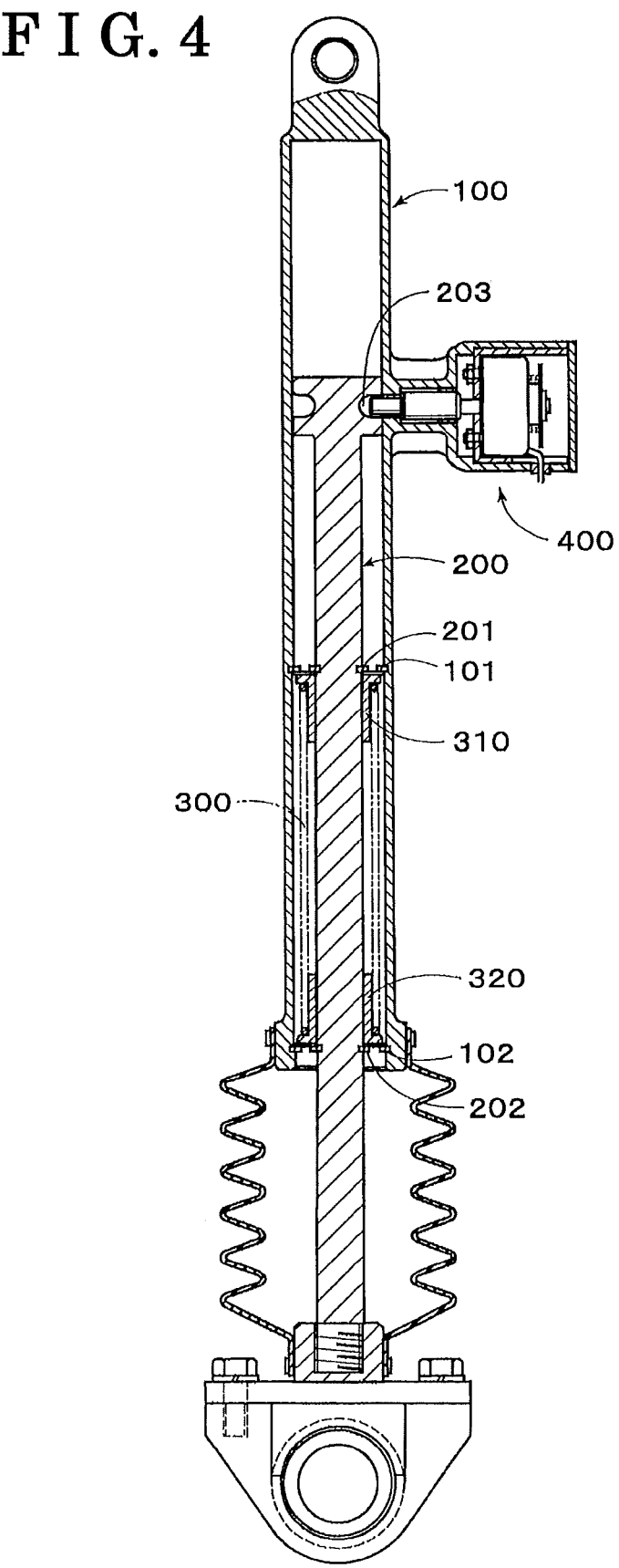
FIG. 4 is a cross-sectional view showing a main configuration of a comparative example of a stabilizer control apparatus to the stabilizer control apparatus according to the first embodiment.

FIG. 4 shows a comparative example of a general configuration of a stabilizer control apparatus including a center spring as a switching means for switching over a spring member 300 from the above-mentioned extendable/retractable position to the above-mentioned neutral position and vice versa. In FIG. 4, main components that are compared with components shown in FIG. 1 are numbered in such a way that zeros are suffixed to the numbers of the components shown in FIG. 1. Further, locking rings 101, 201 serving as locking members for a retainer 310 are arranged at a cylinder member 100 and a piston member 200, respectively. Meanwhile, locking rings 102, 202 as locking members for a retainer 320 are arranged at the cylinder member 100 and the piston member 200, respectively. Furthermore, instead of the hole 21a shown in FIG. 1, an annular groove 203 is formed in a circumferential surface of an upper end portion of the piston member 200. As described above, the rod 11 shown in FIG. 1 is not formed within the cylinder member 100 shown in FIG. 4. Moreover, since the piston member 200 is of a solid member, the spring member 300 is not accommodated within the piston member 200. Accordingly, the axial length of the stabilizer control apparatus shown in FIG. 4 is longer than the axial length of the stabilizer control apparatus according to the first embodiment shown in FIG. 1.

As described above, without addition of a fluid pressure source and a screw mechanism to the stabilizer control apparatus, a simple and inexpensive switching device FS, RS may be configured. In addition, since the tubular piston member 20 is inserted into the cylinder member 10 and the spring member 30 is accommodated within the piston member 20, the entire axial length of the switching device FS, RS may be minimized. Thus, the switching device FS, RS easily and smoothly switches over the spring member 30 from the extract/retract position to the neutral position and vice versa. Additionally, rolling of the vehicle is prevented or minimized while the road holding abilities of the front right/left wheels FR, FL and the rear right/left wheels RR, RL are increased, therefore improving the ability of the vehicle to run on a rough road.

According to the aforementioned embodiments, the engaging/disengaging mechanism 40, 400 supported at the cylinder member 10 includes the lock pin 41, 410 and the solenoid device 42, 420. The lock pin 41, 410 moves between the engaged and disengaged positions through the hole 21a formed in the piston member 20. The solenoid device 42, 420 drives the lock pin 41, 410 to engage with and disengage from the hole 21a.

Accordingly, a simple and inexpensive engaging/disengaging mechanism 40, 400 may be configured. A control for switching the spring member 30 from the extractable/retractable position to the neutral position and vice versa is easily performed by means of the solenoid device 42, 420 serving as the driving device.

According to the aforementioned embodiments, the stabilizer control apparatus further includes the sensor 50 serving as the position detection device detecting a relative position of the piston member 20 to the cylinder member 10 and the controller CT controlling an operation of the solenoid device 42, 420 in accordance with a result of detection of the solenoid device 42, 420.

Accordingly, the neutral position of the spring member 30 is surely detected by the sensor 50 serving as the position detection device. Consequently, such switching control by the solenoid device 42, 420 is smoothly performed.

According to the aforementioned embodiments, the stabilizer control apparatus further includes the rotation preventing mechanism 60 allowing the piston member 20 to axially move relative to the cylinder member 10 and preventing the piston member 20 from rotating around the axis of the piston member 20.

Accordingly, with such a simple configuration of the rotation preventing mechanism 60, the afore-mentioned switching control by the solenoid device 42, 420 is surely performed.

According to the aforementioned embodiments, the cylinder member 10 includes the bottomed tubular housing 10a and the rod 11 extending from the bottom portion of the housing 10a to the opening end of the housing 10a. The piston member 20 includes the first tubular piston 21 into which the rod 11 is inserted, the second tubular piston 22, and the spring member 30. The first tubular piston 21 includes the first and second end portions. The first end portion of the first tubular piston 21 is slidably supported by the rod 11. The second tubular piston 22 includes the first and second end portions. The first end portion of the second tubular piston 22 is fitted in the second end portion of the first tubular piston 21. The second end portion of the second tubular piston 22 is supported by the vehicle body VB and one of the first and second mounting members FM1, FM2. The spring member 30 is accommodated in the internal space of the first tubular piston 21, which is defined by the outer surface of the rod 11 and the inner wall surface of the first tubular piston 21, and is spanned between the first end portion of the first tubular piston 21 and the lower end portion of the rod 11, which is located in the axially opposite direction to the bottom portion of the housing 10a.

According to the aforementioned embodiments, the spring member 30 is attached around the rod 11 in the biased state and supported by first and second retainers 31, 32 arranged at the intermediate portion of the rod 11 and at the lower end portion of the rod 11, respectively, while having the predetermined distance therebetween.

According to the aforementioned embodiments, the rod 11 includes the large-diameter portion 11a extending from the intermediate portion of the rod 11 to the bottom portion of the housing 10a, the small-diameter portion 11b extending in the predetermined distance between the intermediate portion of the rod 11 and the lower end portion of the rod 11, and the end bolt 11e serving as the fixing member and fixed to the lower end portion of the rod 11 in a condition where the spring member 30 is arranged between the first and second retainers 31, 32. The first retainer 31 is arranged in contact with the annular stepped section 11c formed between the large-diameter portion 11a and the small-diameter portion 11b while the second retainer 32 is arranged in contact with the end bolt 11e.

Accordingly, the entire axial length of the switching devices FS, RS is minimized, therefore reducing the size of the switching devices FS, RS. Moreover, the spring member 30 is further easily attached to the rod 11. Thus, an inexpensive switching device FS, RS including components that are easily assembled may be provided.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A stabilizer control apparatus, comprising:
   a stabilizer bar including both ends supported by right and left wheels of a vehicle, respectively, and an intermediate portion supported to a vehicle body by first and second supporting members; and
   a switching device arranged between one of the first and second supporting members and the vehicle body and including a cylinder member, a tubular piston member, a spring member, and an engaging/disengaging mechanism, the switching device switching over the spring member from an extendable/retractable position to a neutral position and vice versa,
      the cylinder member being supported by one of the vehicle body and one of the first and second supporting members,
      the piston member being supported by the other of the vehicle body and one of the first and second supporting members and slidably inserted into the cylinder member,
      the spring member being accommodated in the piston member, which is inserted into the cylinder, and axially spanned between the piston member and the cylinder member,
      the engaging/disengaging mechanism allowing the piston member to axially move relative to the cylinder member when the spring member is in the extendable/retractable position and preventing the piston member from axially moving relative to the cylinder member when the spring member is retained in the neutral position.

2. The stabilizer control apparatus according to claim 1, wherein the engaging/disengaging mechanism supported at the cylinder member includes a locking member and a driving device, the locking member moving between engaged and disengaged positions through a locking portion formed in the piston member, the driving device driving the locking member to engage with and disengage from the locking portion.

3. The stabilizer control apparatus according to claim 2, further comprising a position detection device detecting a relative position of the piston member to the cylinder member and a controller controlling an operation of the driving device in accordance with a result of detection of the position detection device.

4. The stabilizer control apparatus according to claim 3, further comprising a rotation preventing mechanism allowing the piston member to axially move relative to the cylinder member and preventing the piston member from rotating around an axis of the piston member.

5. The stabilizer control apparatus according to claim 4, wherein the cylinder member includes a bottomed tubular housing and a rod extending from a bottom portion of the housing to an opening end of the housing, and
   wherein the piston member includes a first tubular piston into which the rod is inserted, a second tubular piston, and the spring member, the first tubular piston including first and second end portions, the first end portion of the first tubular piston being slidably supported by the rod, the second tubular piston including first and second end portions, the first end portion of the second tubular piston being fitted in the second end portion of the first tubular piston, the second end portion of the second tubular piston being supported by the other of the vehicle body and one of the first and second supporting members, the spring member being accommodated in an internal space of the first tubular piston, which is defined by an outer surface of the rod and an inner wall surface of the first tubular piston, and being spanned between the first end portion of the first tubular piston and an end portion of the rod, which is located in an axially opposite direction to the bottom portion of the housing.

6. The stabilizer control apparatus according to claim 3, wherein the cylinder member includes a bottomed tubular housing and a rod extending from a bottom portion of the housing to an opening end of the housing, and
   wherein the piston member includes a first tubular piston into which the rod is inserted, a second tubular piston, and the spring member, the first tubular piston including first and second end portions, the first end portion of the first tubular piston being slidably supported by the rod, the second tubular piston including first and second end portions, the first end portion of the second tubular piston being fitted in the second end portion of the first tubular piston, the second end portion of the second tubular piston being supported by the other of the vehicle body and one of the first and second supporting members, the spring member being accommodated in an internal space of the first tubular piston, which is defined by an outer surface of the rod and an inner wall surface of the first tubular piston, and being spanned between the first end portion of the first tubular piston and an end portion of the rod, which is located in an axially opposite direction to the bottom portion of the housing.

7. The stabilizer control apparatus according to claim 2, further comprising a rotation preventing mechanism allowing the piston member to axially move relative to the cylinder member and preventing the piston member from rotating around an axis of the piston member.

8. The stabilizer control apparatus according to claim 7, wherein the cylinder member includes a bottomed tubular housing and a rod extending from a bottom portion of the housing to an opening end of the housing, and wherein the piston member includes a first tubular piston into which the rod is inserted, a second tubular piston, and the spring member, the first tubular piston including first and second end portions, the first end portion of the first tubular piston being slidably supported by the rod, the second tubular piston including first and second end portions, the first end portion of the second tubular piston being fitted in the second end portion of the first tubular piston, the second end portion of the second tubular piston being supported by the other of the vehicle body and one of the first and second supporting members, the spring member being accommodated in an internal space of the first tubular piston, which is defined by an outer surface of the rod and an inner wall surface of the first tubular piston, and being spanned between the first end portion of the first tubular piston and an end portion of the rod, which is located in an axially opposite direction to the bottom portion of the housing.

9. The stabilizer control apparatus according to claim 2, wherein the cylinder member includes a bottomed tubular housing and a rod extending from a bottom portion of the housing to an opening end of the housing, and wherein the piston member includes a first tubular piston into which the rod is inserted, a second tubular piston, and the spring member, the first tubular piston including first and second end portions, the first end portion of the first tubular piston being slidably supported by the rod, the second tubular piston including first and second end portions, the first end portion of the second tubular piston being fitted in the second end portion of the first tubular piston, the second end portion of the second tubular piston being supported by the other of the vehicle body and one of the first and second supporting members, the spring member being accommodated in an internal space of the first tubular piston, which is defined by an outer surface of the rod and an inner wall surface of the first tubular piston, and being spanned between the first end portion of the first tubular piston and an end portion of the rod, which is located in an axially opposite direction to the bottom portion of the housing.

10. The stabilizer control apparatus according to claim 1, further comprising a rotation preventing mechanism allowing the piston member to axially move relative to the cylinder member and preventing the piston member from rotating around an axis of the piston member.

11. The stabilizer control apparatus according to claim 10, wherein the cylinder member includes a bottomed tubular housing and a rod extending from a bottom portion of the housing to an opening end of the housing, and wherein the piston member includes a first tubular piston into which the rod is inserted, a second tubular piston, and the spring member, the first tubular piston including first and second end portions, the first end portion of the first tubular piston being slidably supported by the rod, the second tubular piston including first and second end portions, the first end portion of the second tubular piston being fitted in the second end portion of the first tubular piston, the second end portion of the second tubular piston being supported by the other of the vehicle body and one of the first and second supporting members, the spring member being accommodated in an internal space of the first tubular piston, which is defined by an outer surface of the rod and an inner wall surface of the first tubular piston, and being spanned between the first end portion of the first tubular piston and an end portion of the rod, which is located in an axially opposite direction to the bottom portion of the housing.

12. The stabilizer control apparatus according to claim 1, wherein the cylinder member includes a bottomed tubular housing and a rod extending from a bottom portion of the housing to an opening end of the housing, and wherein the piston member includes a first tubular piston into which the rod is inserted, a second tubular piston, and the spring member, the first tubular piston including first and second end portions, the first end portion of the first tubular piston being slidably supported by the rod, the second tubular piston including first and second end portions, the first end portion of the second tubular piston being fitted in the second end portion of the first tubular piston, the second end portion of the second tubular piston being supported by the other of the vehicle body and one of the first and second supporting members, the spring member being accommodated in an internal space of the first tubular piston, which is defined by an outer surface of the rod and an inner wall surface of the first tubular piston, and being spanned between the first end portion of the first tubular piston and an end portion of the rod, which is located in an axially opposite direction to the bottom portion of the housing.

13. The stabilizer control apparatus according to claim 12, wherein the spring member is attached around the rod in a biased state and supported by first and second retainers arranged at an intermediate portion of the rod and at the end portion of the rod, respectively, while having a predetermined distance therebetween.

14. The stabilizer control apparatus according to claim 13, wherein the rod includes a large-diameter portion extending from the intermediate portion of the rod to the bottom portion of the housing, a small-diameter portion extending in the predetermined distance between the intermediate portion of the rod and the end portion of the rod, and a fixing member fixed to the end portion of the rod in a condition where the spring member is arranged between the first and second retainers, and wherein the first retainer is arranged in contact with an annular stepped section formed between the large-diameter portion and the small-diameter portion while the second retainer is arranged in contact with the fixing member.

* * * * *